United States Patent
Sammartin

(10) Patent No.: US 7,497,151 B2
(45) Date of Patent: Mar. 3, 2009

(54) METHOD OF MACHINING A BRAKE DISC

(75) Inventor: Roberto Sammartin, Selvazzano Dentro (IT)

(73) Assignee: Maus S.p.A., Campodarsego PD (IT)

( * ) Notice: Subject to any disclaimer, the term of this patent is extended or adjusted under 35 U.S.C. 154(b) by 466 days.

(21) Appl. No.: 10/546,341

(22) PCT Filed: Mar. 5, 2003

(86) PCT No.: PCT/IT03/00133

§ 371 (c)(1),
(2), (4) Date: Aug. 18, 2005

(87) PCT Pub. No.: WO2004/078413

PCT Pub. Date: Sep. 16, 2004

(65) Prior Publication Data

US 2006/0230888 A1    Oct. 19, 2006

(51) Int. Cl.
*B23B 5/04* (2006.01)

(52) U.S. Cl. .......................... 82/112; 82/162

(58) Field of Classification Search ........... 82/104, 82/105, 112, 123, 124, 152, 164, 170, 414; B23B 05/02, B23B 05/04

See application file for complete search history.

(56) References Cited

U.S. PATENT DOCUMENTS

| 2,733,072 A | * | 1/1956 | Hohwart et al. | 279/4.01 |
| 3,458,209 A | * | 7/1969 | Scholz | 279/134 |
| 4,708,041 A | * | 11/1987 | Granger | 82/165 |

(Continued)

FOREIGN PATENT DOCUMENTS

DE    3911718 A1    10/1990

(Continued)

*Primary Examiner*—Boyer D Ashley
*Assistant Examiner*—Sara Addisu
(74) *Attorney, Agent, or Firm*—James C. Eaves, Jr.; Greenbaum Doll & McDonald PLLC

(57) ABSTRACT

A method of machining mechanical workpieces, in particular of machining the braking surfaces (2,3) of a brake disc (1) for vehicles is described and comprises the steps of loading the workpiece onto a work station (8) and clamping the workpiece in a median reference plane (A) between the opposed braking surfaces (2,3), as well as defining the excess material material thickness to be removed from each of the said surfaces, with respect to the positioning coordinates of the said plane in relation to a system of working axes of the station, to achieve a balanced, centred division of excess metal removed from the said surfaces (2,3). The method also comprises the steps of preliminarily loading and clamping the workpiece on a handling device (7) operatively controlled by the work station (8) for the machining of the workpiece, the workpiece being gripped on the handling device (7) in the region of the said madian place (A), of bringing the said device (7), towards a workpiece-holder chuck (10) of the work station (8) with subsequent measurement of the positioning co-ordinates of the said median plane (A) in relation to the system of working axes, and of clamping the workpiece on the chuck (10) of the work station and releasing the handling device (7) to allow both of the opposed workpiece surfaces (2,3) to be machined in the said work station (8) by removal of the preselected excess material thicknesses calculated in relation to the positioning co-ordinates of the said plane (A).

10 Claims, 3 Drawing Sheets

U.S. PATENT DOCUMENTS

| | | | | |
|---|---|---|---|---|
| 5,299,476 A * | 4/1994 | Tommasini et al. | ............ | 82/122 |
| 6,619,163 B2 * | 9/2003 | Tanio et al. | .................... | 82/112 |
| 7,083,504 B2 * | 8/2006 | Fukao et al. | ................... | 451/52 |
| 7,185,573 B1 * | 3/2007 | Gatton | ........................ | 82/104 |
| 2002/0066185 A1 * | 6/2002 | Loustanau et al | ........ | 29/898.06 |
| 2005/0102818 A1 * | 5/2005 | Caldana | ....................... | 29/564 |
| 2007/0227318 A1 * | 10/2007 | Biertz et al. | .................. | 82/150 |

FOREIGN PATENT DOCUMENTS

| | | |
|---|---|---|
| DE | 3431050 C * | 2/1992 |
| DE | 4028576 A1 | 3/1992 |
| DE | 10126900 A1 | 8/2002 |
| WO | WO 99/62655 | 12/1999 |
| WO | WO 2007086084 A1 * | 8/2007 |

\* cited by examiner

METHOD OF MACHINING A BRAKE DISC

TECHNICAL FIELD

This invention concerns a method of machining mechanical workpieces, in particular of machining the flat surfaces of a brake disc for vehicles. The invention also concerns a work centre that operates in accordance with the method of the invention.

TECHNOLOGICAL BACKGROUND

The invention is particularly, though not exclusively, suited to applications in the specific field of mechanical-workpiece surface machining where a balanced, centred division of the excess metal thickness removed from each of a pair of opposed surfaces is required.

A typical application is that relating to the machining of the opposed flat surfaces of a brake disc for vehicles. In this case, the surface finishing (turning, for example) requires the removal of excess metal thicknesses from these surfaces in a balanced, centred manner in relation to the brake disc's median plane of symmetry, for obvious reasons of weight balancing.

In this field, the above-mentioned operations are typically carried out by clamping the brake disc on the chuck of the machine tool by the engagement of gripping clamps of the workpiece-holder device, for example, a gripper or self-centring chuck, in the radial passages which are created in the disc during the casting of the semifinished workpiece, and which constitute the finned cooling ducts of the brake disc. Clamping the workpiece in this way defines a median reference plane relative to which the excess metal thicknesses to be removed from each of the flat disc surfaces are measured.

One of the main limitations encountered in the known applications lies in the fact that the clamping of the disc in the region of the above-mentioned median plane allows only one of the disc surfaces to be machined because the tools cannot gain access to the other disc surface, i.e. the surface facing the chuck, due to the presence of the clamping device. Once one surface of the disc has been machined, the disc must be positioned and clamped on the chuck a second time to allow the other, opposite surface to be machined.

This double positioning consequently involves an increase in cycle times with a corresponding extension of overall production times and increase in costs. A second positioning could also affect the precision of the required dimensions and tolerances, especially when it is considered that the machined disc surfaces must generally meet fairly tight tolerances of flatness and mutual parallelism.

DESCRIPTION OF THE INVENTION

One of the main objects of the invention is to make available a method of machining mechanical workpieces, in particular of machining the flat surfaces of a brake disc for vehicles, which is designed to overcome all the limitations encountered in the prior art described above.

This and other objects that will become clear from the following description are achieved by a machining method of the above-mentioned type, designed in accordance with the appended claims.

BRIEF DESCRIPTION OF THE DRAWINGS

Further characteristics and advantages of the invention will be more effectively illustrated by the following detailed description of a preferred embodiment of the invention, which Is given purely by way of non-limiting example with reference to the appended drawings, in which.

PREFERRED EMBODIMENT OF THE INVENTION

Figure 1:
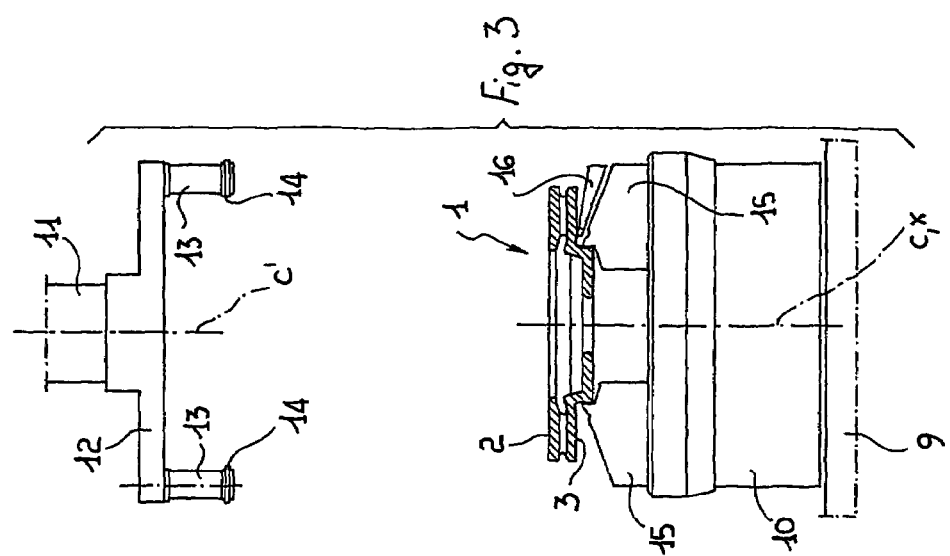
FIGS. 1 to 3 show three different steps of the method of the invention.
Figure 2:
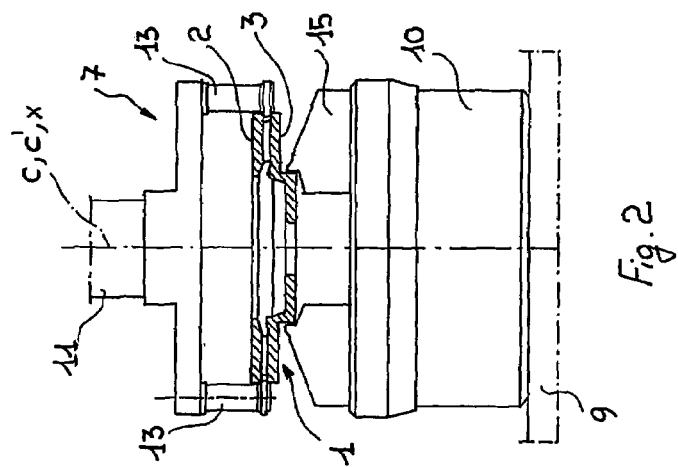
Figure 3:
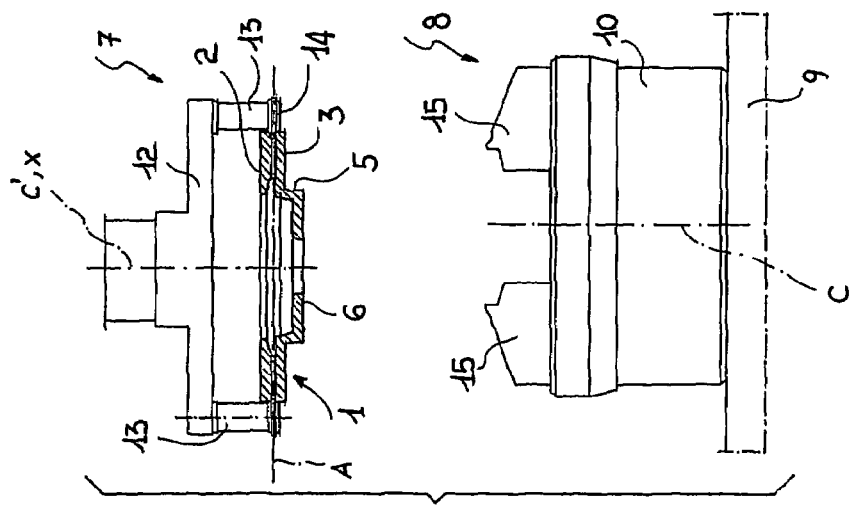

With Initial reference to FIGS. 1 to 3, a semifinished or non-machined workpiece undergoing machining in accordance with the method of this invention is generally indicated 1. The example described relates to the application of the method of the invention in the specific field of semifinished or non-machined workpieces in the form of brake discs, whose machining requires the turning (or other processing involving removal of swarf) of opposed flat surfaces 2, 3 of the brake disc with balanced, centred removal of a pre-established excess thickness from each of the surfaces.

It must, however, be understood that the example described is merely a preferred selection of application since the method of the invention could equally well be applied to any machining operation carried out on any workpiece where a particular requirement is the balanced division of the excess metal to be removed from each of a pair of opposed flat surfaces.

For the sake of simplicity, this description will therefore refer hereafter to the specific application of the method to the semifinished brake disc 1, for the machining of the opposed disc surfaces 2 and 3 thereof.

The brake disc, whose central axis of rotation is marked X, comprises a plurality of radial passages 4 that extend radially in the thickness of the disc between the surfaces 2 and 3. These passages are created when the semifinished workpiece is cast and are spaced angularly at regular intervals to act as ducts that convey air between pairs of corresponding sets of fins to cool the disc braking surfaces.

The semifinished disc surface also comprises a central hub portion 5 that protrudes integrally from the annular area of the braking surfaces 2, 3 and takes the form of an outer cylindrical wall closed by a flange 6 and equipped with one or more brake-disc attachment holes.

A first step of the method of the invention (FIG. 1) involves the loading and clamping of the disc 1 on a handling device that is schematically illustrated and generally indicated 7 in the figures. This device is operatively controlled by station 8 of a work centre that is shown only in part. The figures show only part of a base 9 of a machine tool of the work centre, on which a workpiece-holder apparatus including a chuck 10 having a rotation axis C is supported. The handling device 7 forms part of a workpiece loading/unloading portal associated with the work station or may alternatively be fitted on the machine-tool tool-holder slide. The portion of the handling device that is attached to one or other of the structures indicated is marked 11.

More specifically, the handling device 7 has a support plate 12 which is supported so as to be rotatable about a central axis C' of the plate, and from which a plurality of clamps 13 for gripping the workpiece (preferably three or six clamps, with regular angular spacing) project, all in the same direction. The free ends of the clamps bear respective gripping push rods 14 that extend transversally relative to the axis C' for the centred radial gripping and clamping of the workpiece. The gripping push rods 14 advantageously form part of a gripper for the self-centred clamping of the workpiece in relation to the axis C'. The handling device 7 moves along a system of controlled axes so that its position (the positioning co-ordinates) can be determined In relation to the system of working axes of the station 8.

Figure 4:
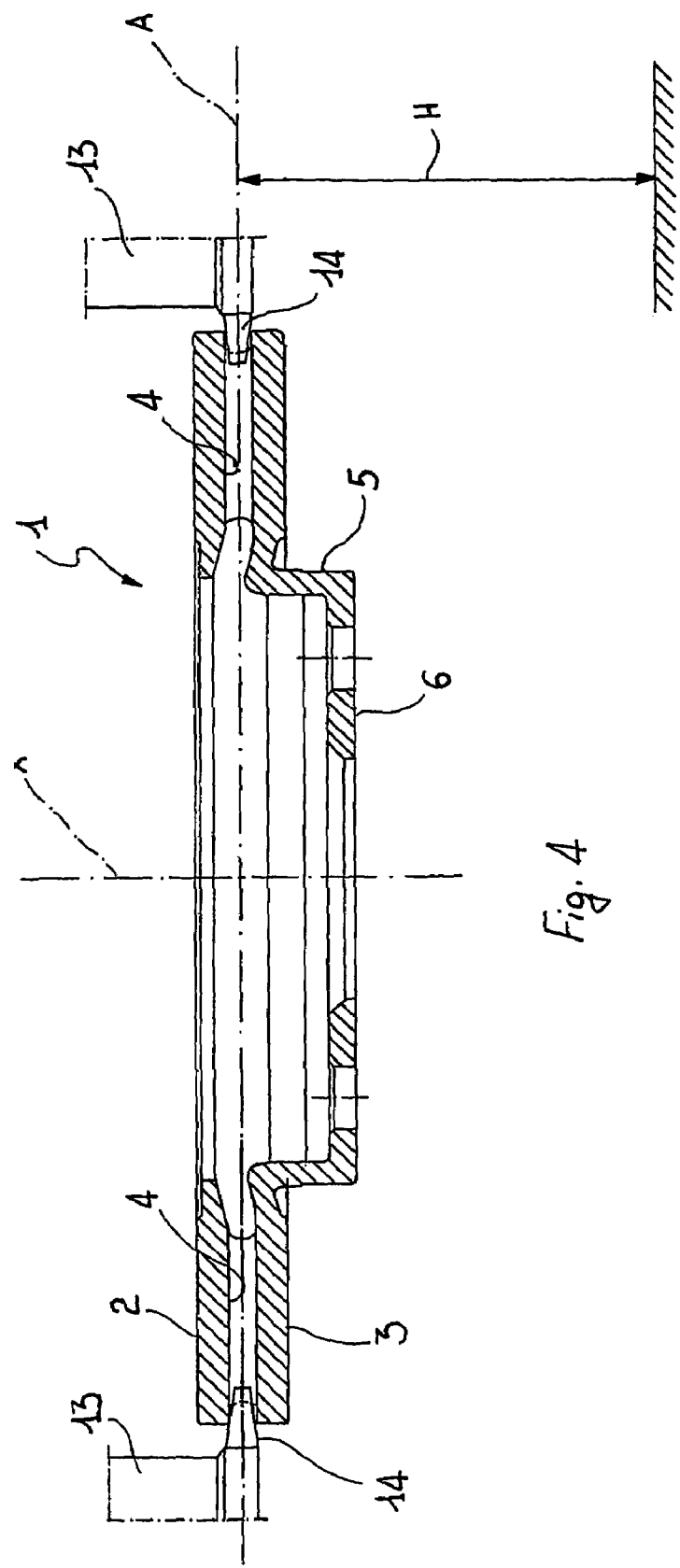
FIG. 4 is a large-scale view of a detail of the previous figures during a respective step of the method of the invention.

As shown in greater detail in FIG. 4, the disc 1 is clamped on the handling device 7 by the engagement of the push rods 14 in the corresponding radial passages 4 of the disc which face the rods 14, with the disc axis X superimposed and centred on the axis C' of the handling device. This engagement of the push rods in the radial passages of the disc defines a median reference plane between the surfaces 2 and 3, which is identified by the straight line marked A in FIG. 4. The co-ordinates of this plane (in particular the vertical height marked H in the figure) can be measured in relation to the system of working axes by the positioning of the handling device, and the plane can in turn be used to define the excess thickness of material to be removed from each of surfaces 2 and 3 so that the tools can be guided to their respective working positions. The preselected thicknesses of material to be removed are therefore divided in a balanced manner with respect to the median plane A to ensure a balanced, centred distribution of disc weights.

In a second step of the method (FIG. 2), the handling device 7 is brought, by movements of the tool-holder slide (or the loading/unloading portal with which the handling device is associated) to the vicinity of the chuck 10, with alignment of the axes C and C', to a position in which the outer wall of the hub portion 5 faces the gripping surfaces of the corresponding clamps 15 of the self-centring clamping apparatus of the chuck 10.

In a subsequent step (FIG. 3), the disc 1 is clamped on the chuck 10, and the handling device 7 is subsequently released and moved away. It should be noted that the positioning co-ordinates of the handling device 7 are measurable in relation to the reference system of the working axes, and that the co-ordinates of the median reference plane A are consequently measurable in relation to the same system. It therefore follows that the preselected thicknesses of excess metal to be removed are in turn measurable in relation to the positioning co-ordinates of the plane A, even when the disc is clamped on the chuck 10 once the handling device 7 has been released and moved away.

In a further, subsequent step, the work station tools are driven along their respective working paths for the machining of the surfaces 2 and 3 with removal of the preselected excess thicknesses of material in a balanced, centred manner.

The clamping of the disc 1 in the self-centering tool of the chuck 10 advantageously allows the machine tools access to each of disc surfaces 2 and 3 by means of one and only one positioning of the disc on the chuck, achieved by means of the steps described above. The configuration and size of the self-centering clamping device of the chuck are such as to allow the tool (indicated 16) to have access to the surface 3 such that it can machine up to the smaller diameter of the annular braking area as shown in FIG. 3.

Figure 5:
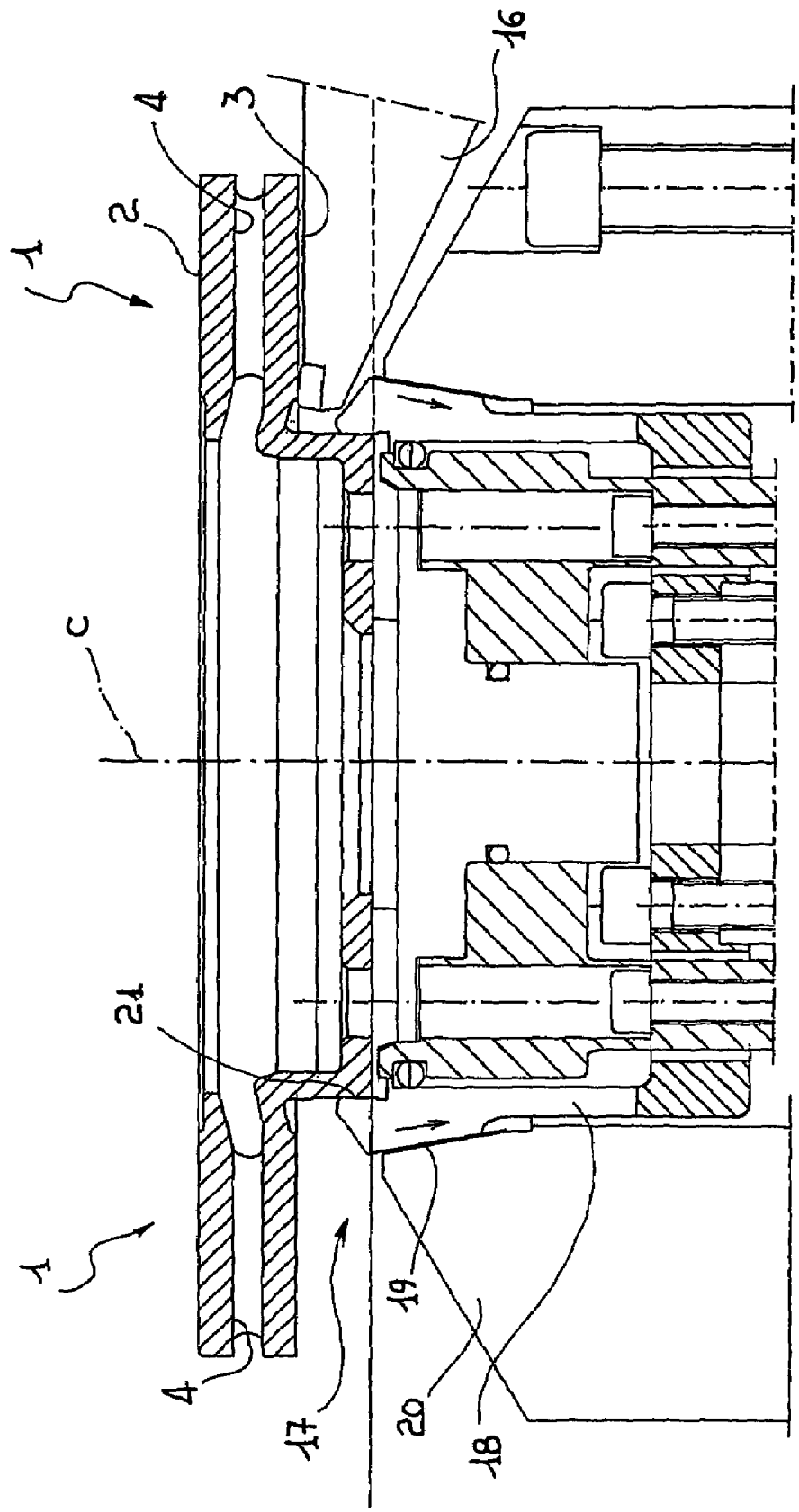
FIG. 5 is a large-scale view that corresponds to FIG. 3 and shows a variant of the apparatus for centring and clamping the workpiece that is being machined in accordance with the method of the invention.

In a variant, shown in FIG. 5, the self-centering clamping device of the chuck 10 advantageously comprises a gripper with a taper profile, generally indicated as 17, that includes an annular gripping element 18 with an outer surface 21 for gripping the mechanical workpiece.

In use, as a result of the relative sliding between the annular element and the tapered guide, brought about by an axial pulling force exerted on the annular element, the surface 21 is urged transversely relative to the axis C against the hub portion 5 so as to exert the force for the clamping the disc on the chuck. Due to the axial symmetry of the tapered guide, the edging action of the annular element is self-centering and thus ensures centered claming of the disc on the chuck.

Advantageously, the overall weight of the gripper 17 is less than that of devices with conventional self-centering clamps and this brings about a consequent reduction in the centrifugal forces generated during the chuck rotation. The clamping forces on the chuck can be reduced for a given chuck speed, or the speed of rotation of the chuck can be increased for a given clamping force applied. In the first case, since the clamping forces of the chuck clamps tend to deform the workpiece, the state of deformation can be reduced by lowering gripping forces. In the second case, on the other hand, it is possible to achieve relatively high cutting speeds that could not be used with conventional self-centering clamps.

The invention therefore achieves the proposed objects by offering numerous advantages over known solutions.

A first advantage lies in the fact that the method of the invention allows machining to be carried out on both of the opposed surfaces of a disc with one and only one positioning of the disc on the chuck. Workpiece loading/unloading times and hence the overall cycle time is consequently reduced.

Another advantage lies in the fact that the single positioning required allows greater precision to be achieved in surface machining operations, with particular reference to the required tolerances of flatness and parallelism between opposed working surfaces of the disc.

The invention claimed is:

1. Method of machining mechanical workpieces, in particular of machining the braking surfaces (2,3) of a brake disc (1) for vehicles, the brake disc (1) of the type that comprises a plurality of radial passages (4) defined in the thickness of the disc (1) included between opposed surfaces (2,3), the method comprising the steps of loading the workpiece onto a work station (8) and clamping the workpiece in a median reference plane (A) between the opposed braking surfaces (2,3), as well as defining the excess material thickness to be removed from each of the said surfaces, with respect to the positioning co-ordinates of the said plane in relation to a system of working axes of the station, to achieve a balanced, centered division of excess metal removed from the said surfaces (2,3), characterized in that it further comprises the following steps:

preliminarily loading and clamping the workpiece on a handling device (7) operatively controlled by the work station (8) for the machining of the workpiece, the workpiece being gripped on the handling device (7) in the region of said median plane (A) and being clamped on the handling device (7) by engagement of respective gripping components of the handling device (7) in at least some of the said radial passages (4), the median plane (A) between the surfaces (2,3) being defined as a result of the positioning of the gripping components in the said passages (4), bringing said handling device (7) towards a workpiece-holder chuck (10) of the work station (8) with subsequent measurement of the positioning co-ordinates of the said median plane (A) in relation to the system of working axes, and clamping the workpiece on the chuck (10) of the work station and releasing the handling device (7) to allow both of the opposed workpiece surfaces (2,3) to be machined in the said work station (8) by removal of the preselected excess material thicknesses calculated in relation to the positioning co-ordinates of the said plane (A).

2. Method according to claim 1 wherein the workpiece is clamped on the chuck (10) of the work station (8), prior to its release from the handling device (7), in the region of a portion (5) of the workpiece that protrudes from and is coaxial with the said surfaces (2,3) to allow the machine tools access to each of the surfaces.

3. Method according to claim 2 wherein the portion of the workpiece that is clamped on the chuck (10) comprises a central hub (5) of a semifinished brake disc (1) that protrudes integrally from the body of disc (1), coaxially with the opposed braking surfaces (2,3).

4. Method according to claim 3 wherein the brake disc (1) is clamped on the chuck (10) in the region of the outer wall of the said hub (5), thus allowing free access by the machining tools to each of the opposed disc braking surfaces (2,3).

5. Method according to claim 2 wherein the workpiece is a non-machined or semifinished brake disc (1) of the type that comprises a plurality of radial passages (4) defined in the thickness of the disc (1) included between the said opposed surfaces (2,3), the disc in turn being clamped on the handling device (7) by engagement of respective gripping components of the handling device (7) in at least some of the said radial passages (4), the median plane (A) between the surfaces (2,3) being defined as a result of the positioning of the gripping components in the said passages (4).

6. Method according to claim 5 wherein the said radial passages (4) are defined between pairs of corresponding finned formations extending radially in the thickness of the said disc (1) and spaced angularly at regular intervals.

7. Method according to claim 5 wherein the portion of the semifinished workpiece that is clamped on the chuck (10) comprises a central hub (5) of the semifinished brake disc (1) that protrudes integrally from the body of disc (1), coaxially with the opposed braking surfaces (2,3).

8. Method according to claim 7 wherein the brake disc (1) is clamped on the chuck (10) in the region of the outer wall of the said hub (5), thus allowing free access by the machining tools to each of the opposed disc braking surfaces (2,3).

9. Method according to claim 1 wherein the said radial passages (4) are defined between pairs of corresponding finned formations extending radially in the thickness of the said disc (1) and spaced angularly at regular intervals.

10. Method according to claim 1 wherein the machining operations performed on the opposed brake disc surfaces (2,3) comprise turning or surface finishing with removal of material to obtain a balanced division of the excess metal removed from each of the surfaces (2,3).

* * * * *